March 23, 1954     R. W. GILBERT     2,673,328
FREQUENCY METER
Filed Nov. 18, 1950
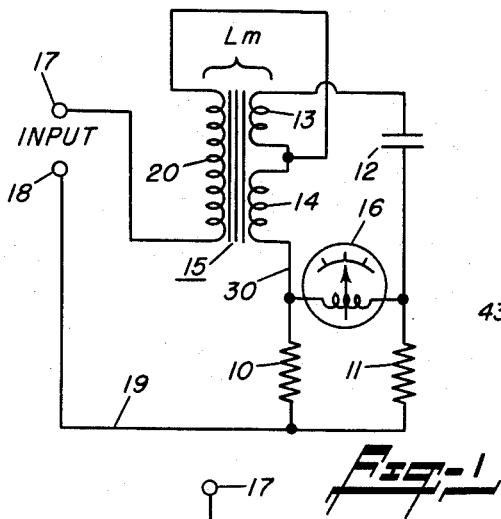
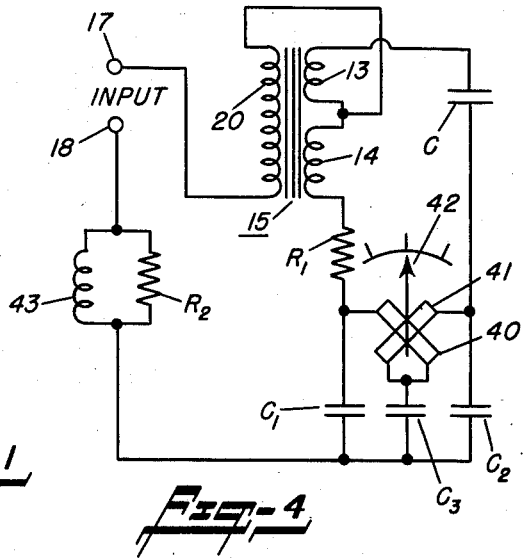
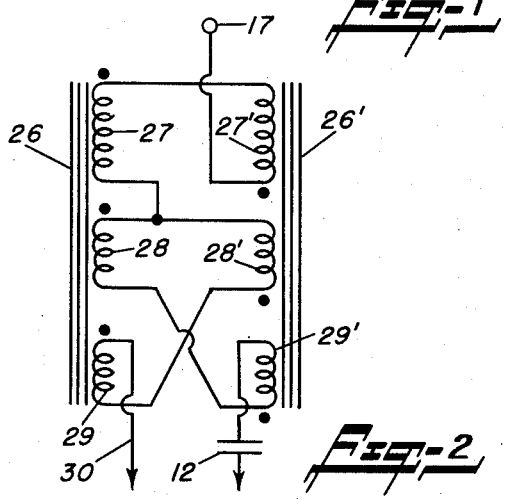
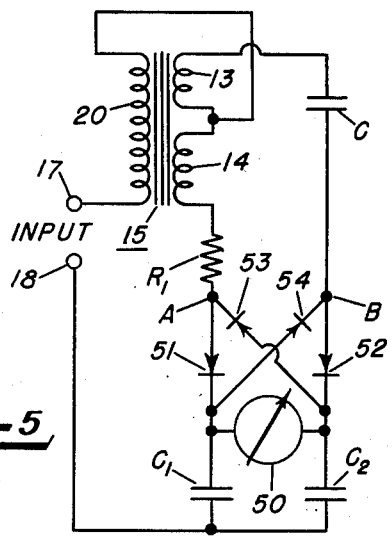
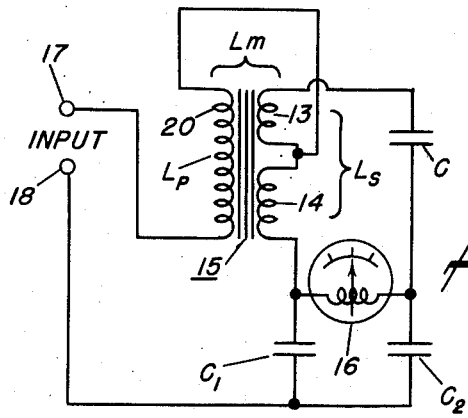
ROSWELL W. GILBERT
INVENTOR.
BY
ATTORNEYS Patented Mar. 23, 1954

2,673,328

UNITED STATES PATENT OFFICE 2,673,328

FREQUENCY METER

Roswell W. Gilbert, Montclair, N. J., assignor to Weston Electrical Instrument Corporation, Newark, N. J., a corporation of New Jersey Application November 18, 1950, Serial No. 196,420

5 Claims. (Cl. 324—78)

This invention relates to a frequency meter and more particularly to a frequency-sensitive bridge network employing mutual inductance balanced against a capacitance.

The circuit herein disclosed is not a resonant circuit in the usual sense but, rather, is classified as a four terminal bridge network having a zero transfer impedance at a specific balance frequency, a small phase angle at frequencies close to the balance frequency, and a phase angle approaching quadrature at harmonics of the balance frequency. These characteristics may be considered as the qualitative requirements for proper operation of the instrument mechanism.

My novel circuit may be used with crossed-coil dynamometer instruments or with phased rectifier instruments and it is particularly well suited for narrow range applications, that is, to indicate relatively small deviations from a specific predetermined frequency. The desirable features and advantages of the invention may be listed as follows:

1. Circuit losses are balanced (particularly the copper losses of the reactor) to eliminate the frequency-temperature coefficient produced by unbalanced losses at the center, or balance, frequency;

2. Quadrature output components of the balance frequency can be balanced out effectively over the working range of the device;

3. Harmonics are maintained in quadrature for independence of wave form;

4. Scale distribution of the indicating meter is symmetrical with respect to the fundamental, or center, frequency and the incremental sensitivity is expanded somewhat at the center; and 5. Phase angles of the reactor and the capacitor are of no first order concern.

An object of this invention is the provision of a high grade, efficient frequency meter having a high sensitivity, good torque and which can be produced at relatively low cost.

An object of this invention is the provision of a resonant transfer network employing mutual inductance balanced against capacitance for use with an electro-dynamometer or phased rectifier instrument to indicate frequency.

An object of this invention is the provision of frequency meter comprising an indicating instrument associated with a four terminal bridge network having zero transfer impedance at a specific frequency.

An object of this invention is the provision of a frequency meter comprising an indicating instrument connected across the diagonals of a four terminal bridge network, said bridge network including a center tapped reactor whereby the reactor copper losses are symmetrical in the bridge arms and, therefore, of no adverse effect at the bridge-balance frequency.

An object of this invention is the provision of a frequency meter comprising a bridge having two equal resistive arms, a capacitive arm and an inductive arm, said inductive arm comprising a reactor having a center-tapped secondary winding connected to a primary winding, an indicating instrument connected across one set of bridge diagonals and an input source connected across the other bridge diagonals through the primary winding of the reactor.

An object of this invention is the provision of a frequency meter comprising a reactor having a center-tapped secondary winding forming two adjacent arms of a bridge, a capacitor connected in one such bridge arm, a pair of impedances forming the other two arms of the bridge, an indicating instrument connected across one set of opposed bridge junctions, a primary winding on the reactor, one end of said primary winding connected to the center tap of the reactor secondary winding, and input terminals connected between another bridge junction and the other end of the said primary winding.

An object of this invention is the provision of a frequency meter comprising a reactor having a center-tapped secondary winding forming two adjacent arms of a bridge, a capacitor connected in one such bridge arm, a pair of equal capacitors forming the other two arms of the bridge, a dynamometer instrument having a pair of crossed coils connected in series across opposed junctions of the bridge and a field coil connected between a first input terminal and another bridge junction, a capacitor connected between the last mentioned bridge junction and each of the crossed coils, and a primary winding on the reactor, said primary winding being connected between the center tap of the reactor secondary winding and a second input terminal.

An object of this invention is the provision of a frequency meter comprising a reactor having a center-tapped secondary winding forming two arms of a bridge, a capacitor and a rectifier element connected in one such bridge arm, a resistance and a rectifier element connected in the other such bridge arm, a pair of equal capacitors forming the other two arms of the bridge, a D.-C. indicating instrument connected across opposed junctions of the bridge, a pair of rectifier elements independently cross-connected between the indicating instrument and adjacent bridge arms, a primary winding on the reactor, said winding connected between the center tap of the reactor secondary coils and a first input terminal, and a second input terminal connected to bridge junction formed by the said equal capacitors.

The above stated and other objects and advantages will become apparent from the following description when taken with the accompanying drawings illustrating several embodiments of the invention. The drawings are for purposes of description and are not to be construed as defining the scope or limits of the invention, reference being had for the latter purpose to the appended claims.

In the drawings wherein like reference characters refer to like parts in the several figures.

Figure 1 is a wiring diagram of a frequency-sensitive bridge made in accordance with this invention;

Figure 2 is a diagrammatic representation of a two-legged reactor design that minimizes leakage reactance and results in a balancing of the effects of temperature on the secondary copper windings;

Figure 3 is similar to Figure 1 except that the lower bridge arms comprise capacitors for eliminating the effect of harmonics;

Figure 4 illustrates the application of the frequency-sensitive bridge network to a crossed-coil dynamometer indicating instrument; and Figure 5 illustrates the application of the network to a phased-rectifier system employing a D.-C. indicating instrument.

Reference is now made to Figure 1 wherein the frequency-sensitive bridge comprises two arms formed by the equal resistors 10, 11, a capacitor 12 and the two windings 13, 14 of a reactor 15, balanced for the condition of equal reactance. An indicating instrument 16 is connected across one set of opposed junctions of the bridge and the circuit to be measured is connected across the other set of opposed bridge junctions through the input terminals 17 and 18. It will be noted that the input terminal 18 is connected directly to a bridge junction by the wire 19 whereas the other input terminal is connected to the opposed bridge junction through the primary winding 20 of the reactor. The relative polarity of the reactor windings is such that at the center frequency the potential developed across the secondary windings 13, 14, opposes the drop across the capacitive reactance 12 to balance the bridge. Each half of the reactor secondary (windings 13, 14) carries a bridge branch current in mutual opposition whereby the self-inductance of the secondary cancels at bridge balance, leaving only the primary-secondary mutual inductance effective in the bridge.

The capacitive bridge arm 12 carries one branch current but the mutual inductance carries the total bridge current or twice the branch current. Thus, the bridge balances at a frequency where:

$$X_c = 2X_m$$

where $X_c$ is the reactance of the capacitive bridge arm, and $X_m$ is the reactance of the mutual inductance between the primary winding 20 and the total secondary windings 13, 14.

From the above, the balance frequency of the bridge is:

$$W = (2L_m C)^{-1/2}$$

where

C is the capacity of the condenser 12, and $L_m$ is the mutual inductance between the primary winding 20 and the total secondary windings 13, 14.

With a primary to secondary coupling factor of unity the mutual reactance will relate to the self-reactances of the primary and secondary, $X_p$ and $X_s$, respectively, as:

$$X_m = (X_p X_s)^{1/2}$$

For the specific condition where the primary and secondary self-inductances ($L_p$ and $L_s$, respectively), are related $$\left(\text{as } L_p = \frac{L_s}{4}\right)$$

solution of the reactance expressions indicates that the reactances of the capacitance arm and the reactor secondary will be equal at the bridge balance frequency, that the circuit will be in full resonance, and the bridge will appear resistive to the source. This condition appears to be the design optimum for this particular circuit.

The major advantage of the network appears to be its ability to balance the reactor secondary losses (notably the winding resistance) equally with respect to the branch currents of the bridge. Thus, the resistance-temperature coefficient of a winding properly balanced will not change the frequency at which the bridge balances. Also, changes of inductance or capacitance with temperature level, or other influences, may be compensated by correlated changes in the resistive arms. For example, the temperature coefficient of the capacitor can be corrected by an appropriate coefficient of resistance, and the level coefficient of the reactor can be compensated, in some measure, by a non-linear resistor such as a "Thermistor."

Proper balance of losses is contingent upon bridge symmetry and a balanced design of the reactor. Also, leakage reactance should be minimized to attain a maximum stability of mutual inductance. These considerations require a proper balancing and mixing of the reactor windings with respect both to coupling reactance and resistance.

Figure 2 is a diagrammatic representation of a reactor designed for these purposes. It comprises the two-legged core 26, 26', each leg carrying primary windings 27, 27' and overlying secondary windings 28, 28' and 29, 29'. The corresponding windings on each of the legs, or cores, are of equal turns, and are connected, as shown, to obtain resistive and reactive symmetry. Leakage reactance appears as a negative resistance in the $L_m$ arm of the bridge, Figure 1, causing a quadrature component in the indicating instrument 16. This, however, can be balanced out by a small amount of positive resistance in the $L_m$ arm which can also include compensation for phase angle in the capacitive arm 12 of the bridge.

It will be apparent that a reactor made as shown in Figure 2 can be inserted into the Figure 1 circuit as indicated by the related reference numerals, namely, the input terminal 17, the capacitor 12 and the lead 30.

Figure 3 illustrates a modification of the Figure 1 circuit to eliminate the effects of harmonics. In this case the bridge comprises two equal capacitive ratio arms formed by the condensers $C_1$ and $C_2$, a capacitive arm C and an inductive arm $L_m$. The secondary inductance $L_s$ is, again, center-tap fed so that at the bridge-balance frequency it and its copper loss are symmetrical in the bridge branches and, therefore, ineffective. The mutual $L_m$ carries the full bridge current while the balancing reactance C carries one branch current, or half of the bridge current. Consequently, a network resonance occurs at: $W=(2L_mC)^{-1/2}$, which is the bridge balance frequency, as before.

The reactor 15 is designed for equal primary and secondary inductance, or $L_p=L_s$, and for substantially unity coupling coefficient, so that:

$$L_m=(L_pL_s)^{1/2}=L_p=L_s$$

When the bridge is balanced the $L_m$ and C arms are in resonance and only the self-inductance of the reactor primary is presented to the input source. This, in turn, is resonated as a series circuit by the total ratio arm capacitance whereby;

$$C_1+C_2=\frac{1}{W^2L_p}$$

and, since $C_1=C_2$, $$C_1=C_2=\frac{1}{2W^2L_p}$$

and, as before, $$W=(2L_mC)^{-\frac{1}{2}}$$

From the above preceding three equations it will be apparent that the three capacitors, C, $C_1$, and $C_2$ are nominally equal.

It may here be pointed out that by series-resonating the bridge, harmonics of the fundamental frequency effectively are rejected and/or reduced in magnitude for better independence of wave-form. Also, the indicating instrument is protected, in some measure, from off-scale frequency by a reduction of bridge current when off resonance.

The application of the circuit to a crossed-coil instrument, of the dynamometer type, is illustrated in Figure 4 wherein, again, the reactor is shown in its simplified form for purposes of clarity. The Figure 4 circuit is basically identical to that of Figure 3 and modified to accommodate the particular indicating instrument. The resistor $R_1$ compensates for unavoidable slight residual leakage reactance, to balance out the residual quadrature component of current that remains when the bridge is balanced. The coils 40, 41 of the indicating instrument are crossed symmetrically with respect to the pointer 42 and are connected in series across opposed bridge junctions. Holding current for the coils is drawn from the mid-connection of the capacitor $C_3$. The field coil 43 of the instrument is connected between a bridge junction and the input terminal 18. It will be apparent that the bridge load comprises the resistance of the movable coils 40, 41 and that the field coil of the instrument is excited by the total bridge current.

The unbalance potential developed by the bridge is reactive, but the bridge impedance presented to the load is also reactive so the bridge output current delivered to a low value of resistive load is in phase with the source current. However, as the load resistance presented to the bridge is increased, a phase shift due to bridge reactance against the resistive load develops. This affects efficiency but not accuracy, but, in general, it is desirable to keep the load resistance (the coils in series) low with respect to the bridge output reactance, which in this case is equal to the reactance of each of the equal arms. A ratio of about 3 to 4 is suggested, and can be compensated entirely or partly by resistance $R_2$ shunting the field to develop a compensating shift in field excitation. Also, mismatching the bridge slightly will minimize the effect of mutual inductance in the instrument. In any case, compensation for bridge loading is a consideration of efficiency only, and will not effect accuracy except in terms of the small additional operating torque developed by the instrument.

It is to be noted that adjustment of the circuit to center frequency, by adjusting the reactor air-gap, changes both the mutual $L_m$ and the primary self-inductance $L_p$ equally, to automatically track the bridge and the series circuit resonances. However, the scale-spread adjustment must be made by alteration of $C_3$, but, $C_3$ is normally small with respect to $C_1$ and $C_2$, and its effect upon series resonance is inconsequential.

Figure 5 illustrates the phased-rectifier embodiment of the invention for operation of a D.-C. indicating instrument. Again, the circuit is essentially similar to that shown in Figure 3 with a conventional D.-C. instrument 50 connected across opposed bridge junctions. Included in each of the bridge arms containing the secondary windings 13, 14 of the reactor, are the rectifier elements 51 and 52. Cross-connected between these bridge arms and the instrument are the rectifier elements 53, 54. It will be noted that the rectifier elements form a series loop constituting a modulator bridge. The total bridge current, flowing equally through $C_1$ and $C_2$, provides the switching current for the modulator bridge but such current produces no output to the D.-C. instrument 50. Unbalance of the resonant network, due to a frequency deviation from the balance frequency, causes a potential to appear between the points A and B which potential is phase rectified by the modulator bridge to produce an output in the instrument 50, such output having a direction responsive to the direction of the frequency deviation.

The Figure 5 circuit is not a ratio system and, consequently, is voltage-dependent directly as the instrument deflection varies from the center, or balance, frequency position. However, the circuit is useful as a frequency relay system or in cases where the center frequency only is of importance. The circuit appears to be as good as the match obtainable between the rectifier elements and the Q factor of the reactor. At higher frequencies the Q of the reactor improves appreciably which lessens susceptibility to rectifier mis-match, and the circuit is, therefore, particularly effective at higher frequencies.

In any of the hereinabove described circuits, the particular indicating instrument employed may be provided with a scale plate calibrated in frequency. Preferably, the instrument is so adjusted that its pointer will rest substantially at the mechanical center of the scale at the bridge balance frequency whereby frequency deviations result in a pointer deflection to either side of such center position. Those skilled in this art will also appreciate the fact that the indicating instrument may be replaced by a suitable relay to provide an alarm upon frequency deviations from that for which the bridge is designed. In general, the invention provides a simple, frequency-sensitive bridge providing an output current directive in sense and magnitude dependent upon frequency deviations from a predetermined value.

Those skilled in this art will also understand that the effective input terminals of the bridge are the junction formed by the mid-connection of the secondary windings of the reactor and the diagonally-opposed junction of the two equal impedances, as for example, the junction of the capacitors $C_1$ and $C_2$, in Figure 4. The input source, the primary winding of the reactor and the dynamometer field coil form a series circuit connected across such input bridge terminals. Consequently, the precise location of any such component of the series circuit is not of importance to the proper operation of the circuit so long as the series circuit arrangement is maintained.

Having now described my invention in detail in accordance with the patent statutes, various changes and modifications will suggest themselves to those skilled in this art, and it is intended that such changes and modifications shall fall within the spirit and scope of the invention as recited in the following claims.

I claim:

1. A transfer network resonant at a given frequency said network comprising a four arm bridge having a pair of input junctions and a pair of output junctions; a mutual reactor having a center-tapped first winding forming two adjacent arms of the bridge, said center tap constituting one bridge input junction; a capacitor connected in one such bridge arm, said capacitor having a value to resonate the mutual inductance of the reactor thereby producing a condition of zero transfer at the given frequency; a pair of capacitors forming the other two adjacent arms of the bridge, said capacitors being connected to constitute the other bridge input junction; a pair of input terminals; and a second winding on said mutual reactor, said second winding being interposed between one of the said input terminals and one of said bridge input junctions, the said pair of capacitors having values to resonate the self inductance of the said second winding at the given frequency.

2. The invention as recited in claim 1, wherein the reactor comprises a two-legged core and the said first and second windings comprise dual windings carried on each core leg, the corresponding windings on each core leg being of equal turns and connected in resistive and reactive symmetry.

3. The invention as recited in claim 1 in combination with an indicating instrument connected across the bridge output junctions said instrument including a pointer cooperating with a scale marked in terms of frequency.

4. The invention as recited in claim 3, wherein the indicating instrument is an electro-dynamometer having a field coil and a pair of crossed movable coils, said movable coils being connected in series across the bridge output junctions, and said field coil being connected between an input terminal and a bridge input junction; and a capacitor connected between each of the said movable coils and the said other bridge input junction.

5. The invention as recited in claim 3, including a rectifier element connected in series with each section of the center-tapped first reactor winding and the bridge output junctions, and a pair of rectifier elements independently cross-connected between the bridge output junctions and the adjacent bridge arms formed by the said center-tapped reactor winding.

ROSWELL W. GILBERT.

References Cited in the file of this patent

UNITED STATES PATENTS

| Number | Name | Date |
| --- | --- | --- |
| 2,477,074 | McIntosh | July 26, 1949 |

FOREIGN PATENTS

| Number | Country | Date |
| --- | --- | --- |
| 868,091 | France | Sept. 15, 1941 |

OTHER REFERENCES

"Alternating Current Bridge Methods," by B. Hague, 4th ed., pub. Pitman Pub. Corp. of New York, 1938, pp. 438, 466, 467, 512.